United States Patent
Cui et al.

(10) Patent No.: US 12,524,615 B2
(45) Date of Patent: Jan. 13, 2026

(54) EFFICIENT HYBRID TEXT NORMALIZATION

(71) Applicant: Tencent America LLC, Palo Alto, CA (US)

(72) Inventors: Jia Cui, Bellevue, WA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 302 days.

(21) Appl. No.: 17/940,525

(22) Filed: Sep. 8, 2022

(65) Prior Publication Data
US 2024/0086637 A1    Mar. 14, 2024

(51) Int. Cl.
*G06F 40/295*   (2020.01)
*G06F 40/151*   (2020.01)
*G06F 40/279*   (2020.01)
*G06F 40/284*   (2020.01)
*G06F 40/289*   (2020.01)
*G06F 40/30*    (2020.01)
*G06F 40/40*    (2020.01)
*G06F 40/42*    (2020.01)
*G06N 5/025*    (2023.01)

(52) U.S. Cl.
CPC .......... *G06F 40/295* (2020.01); *G06F 40/151* (2020.01); *G06F 40/279* (2020.01); *G06F 40/284* (2020.01); *G06F 40/289* (2020.01); *G06F 40/30* (2020.01); *G06F 40/40* (2020.01); *G06F 40/42* (2020.01); *G06N 5/025* (2013.01)

(58) Field of Classification Search
CPC ...... G06F 40/30; G06F 40/295; G06F 40/279; G06F 40/284; G06F 40/289; G06F 40/151; G06F 40/40; G06F 40/42; G06N 5/025
See application file for complete search history.

(56) References Cited

U.S. PATENT DOCUMENTS

| | | |
|---|---|---|
| 6,581,033 B1 | 6/2003 | Reynar et al. |
| 2002/0143871 A1* | 10/2002 | Meyer ............ G06Q 10/107 709/204 |
| 2004/0220797 A1 | 11/2004 | Wang et al. |
| 2006/0069545 A1 | 3/2006 | Wu et al. |
| 2009/0281791 A1* | 11/2009 | Li .............. G06F 40/284 704/9 |
| 2010/0082348 A1 | 4/2010 | Silverman et al. |
| 2012/0262461 A1* | 10/2012 | Fisher ........... G06F 40/274 345/467 |
| 2017/0116177 A1* | 4/2017 | Walia ............. H04M 7/0045 |
| 2018/0330729 A1* | 11/2018 | Golipour ............ G10L 15/26 |

(Continued)

OTHER PUBLICATIONS

Zhang et al., "A hybrid text normalization system using multi-head self-attention for mandarin." ICASSP 2020-2020 IEEE international conference on acoustics, speech and signal processing (ICASSP). IEEE. (Year: 2020).*

(Continued)

*Primary Examiner* — Samuel G Neway
(74) *Attorney, Agent, or Firm* — Sughrue Mion, PLLC

(57) ABSTRACT

Methods and devices to efficiently normalize text by processing inputted text based on a text normalization model that includes processing the input text in a first stage including a statistical model as a first output, processing the first output in a second stage including a rule based model as a normalized text, and outputting the normalized text.

15 Claims, 7 Drawing Sheets

(56) References Cited

U.S. PATENT DOCUMENTS

| | | | |
|---|---|---|---|
| 2019/0103091 A1* | 4/2019 | Chen | G06N 3/08 |
| 2020/0125801 A1* | 4/2020 | Beaver | G06F 40/30 |
| 2024/0086637 A1* | 3/2024 | Cui | G06F 40/151 |

OTHER PUBLICATIONS

Trang et al., "A hybrid method for Vietnamese text normalization." Proceedings of the 2019 3rd International Conference on Natural Language Processing and Information Retrieval. (Year: 2019).*
Written Opinion dated May 30, 2023 in International Application No. PCT/US2023/015362.
International Search Report dated May 30, 2023 in International Application No. PCT/US2023/015362.
Sun et al., "BERT4Rec: Sequential Recommendation with Bidirectional Encoder Representations from Transformer" Proceedings of the 28th ACM international conference on information and knowledge management. 2019 (11 pages total).

\* cited by examiner

EFFICIENT HYBRID TEXT NORMALIZATION

FIELD OF THE INVENTION

The present disclosure relates generally to text to speech systems, and more particularly to methods and apparatuses for text normalization.

BACKGROUND OF THE INVENTION

Text normalization, which converts numbers and symbols to corresponding regular words, is an important bridge between speech and text representations. Traditionally, text normalization is processed by hand-crafted rules. Each rule may describe a template-based scenario and the corresponding operations. Because of the complexity of natural language, the number of rules may easily go up to thousands. Moreover, some rules may have overlapping conditions leading to ambiguous scenario. Therefore, it is also important to assign reasonable ranks to the rule set. Since hand-crafting a large number of rules may be time and resource consuming, there is a need for more efficient methods and techniques.

SUMMARY OF THE INVENTION

According to some embodiments, systems and methods are provided for a method for normalizing text.

According to an exemplary embodiment, a method for normalizing text includes receiving an input text and processing the input text based on a text normalization model. The processing the input text further includes (i) processing the input text in a first stage including a statistical model as a first output; (ii) processing the first output in a second stage including a rule based model as a normalized text; and (iii) outputting the normalized text.

According to an exemplary embodiment, an apparatus for text normalization includes at least one memory configured to store computer program code, and at least one processor configured to operate as instructed by the computer program code. The computer program code includes text normalization code configured to cause the at least one processor to generate at least one normalized text. The text normalization code includes receiving code configured to cause the at least one processor to receive an input text. The text normalization code further includes first stage code configured to cause the at least one processor to generate a statistical model which processes the input text as a first output. The text normalization code further includes second stage code configured to cause the at least one processor to generate a rule based model which transforms the first output to an outputted normalized text.

According to an exemplary embodiment a non-transitory computer readable medium having instructions stored therein, which when executed by a processor cause the processor to receive an input text. The instructions further cause the processor to process the input text based on a text normalization model including: (i) process the input text in a first stage including a statistical model as a first output; (ii) process the first output in a second stage including a rule based model as a normalized text; and (iii) output the normalized text.

DETAILED DESCRIPTION OF THE INVENTION

Figure 1:
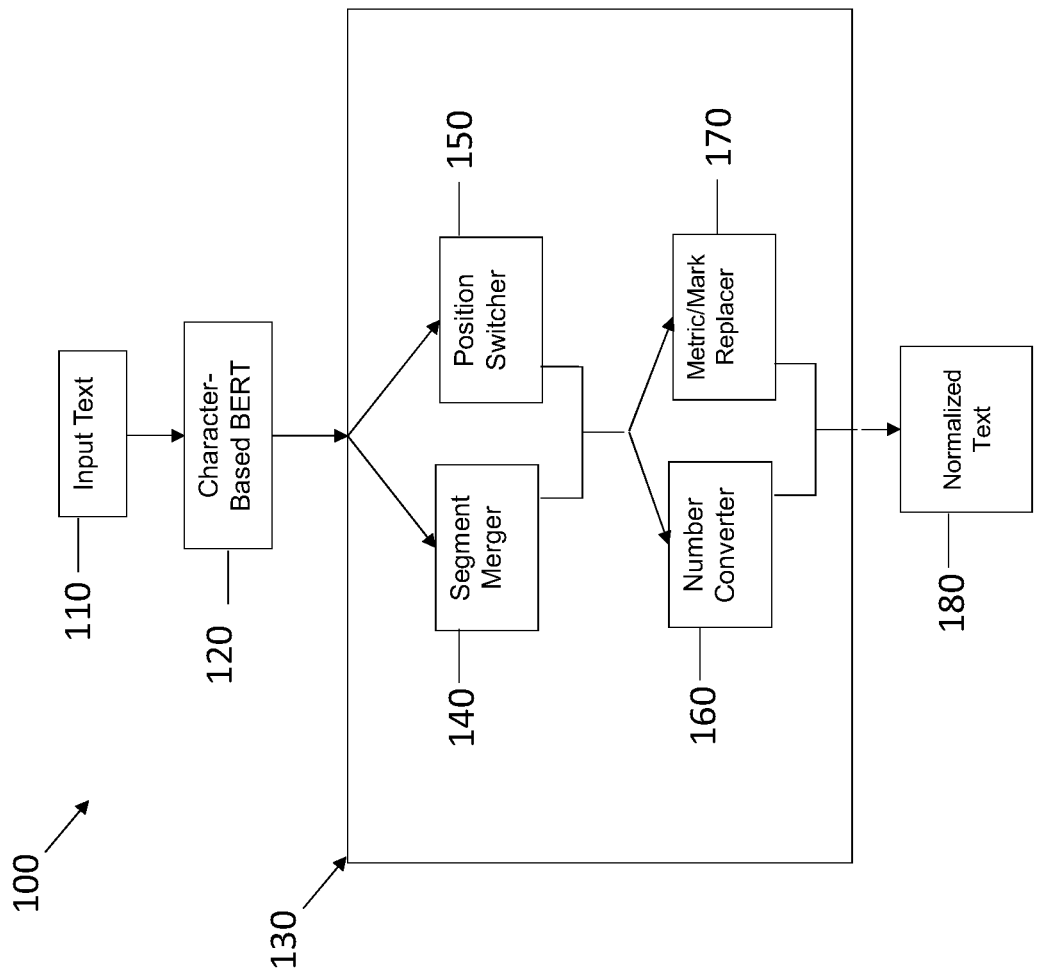
FIG. 1 is an embodiment of a block diagram of the text normalization system.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and "[B]" or "at least one of [A] or [B]" are to be understood as including only A, only B, or both A and B.

Embodiments of the present disclosure are detailed to a hybrid two-stage pipeline, where the first stage may use a statistical model for sequence labeling and the second stage may use rule-based programs for fast and precise conversion. The statistical model may cover a wide range of context to understand the category of the number/symbol sequence. The rule-based programs may convert the subsequence precisely because the conversion is usually determined for each category.

FIG. 1 discloses an embodiment of the text normalization apparatus 100. The text normalization apparatus 100 may comprise an input text 110, fed into a character based Bidirectional Encoder Representations from Transformers (BERT) model 120. The output of the BERT model 120 may then be acted upon by a rules based model 130. The rules based model 130 may comprise a segment converter 140, a position switcher 150, a number converter 160 and a metric/mark replacer 170. After processing in the tag-based converter 130, the normalization apparatus 100 may output a normalized text 180. The text normalization apparatus 100 may be comprised of additional blocks, such as additional rule layers, different size BERT modules as well as additional checking and operational computations.

The input text 110 may comprise a string of text made of combinations of characters comprising text and other marks such as punctuation. For example, the input text 110 may be a string such as a date. Dates, typically contain a mixture of marks and text. There are a variety of forms containing the same information such as "Feb. 2, 2014" or "2/2/14." Other examples may be text messages, which typically contain other marks such as emojis or emails, which may contain a variety of punctuation such as the "g" mark. Another example of input text 110 may be metrics or measurements, which may sometimes be ambiguous without context. For example, "16M" may refer to "sixteen megabytes" or "sixteen meters" depending on the reading. As a non-limiting list, the input text 110 may be a mathematical expression, a website url, program code, language text, combination of languages, any combination of the previously listed examples or any unique mark.

After receiving the input text 110, the text normalization apparatus 100 passes the text to the character based BERT 120. The character based BERT model 120 may be fully trained and labels each character by predefined tags. In some embodiments, the BERT model 120 may be a full-size BERT model, or in other embodiments a one-layer BERT model. The one layer BERT model is generally faster than the full-size BERT model, however the smaller sized model may induce a performance drop such as larger error rates. One way to make up for the drop is adding Conditional Random Field (CRF), loss operation which labels the segment as a whole instead of independent characters. Other embodiments may use the full-sized BERT model alongside the CFR loss operation, the one-layer BERT model without the CFR or the full-size BERT model without the CFR loss operation.

After tagging the input text, the BERT model 120 passes the information to the rules based model 130. The rules based model 130 takes the tagged text and parses through the text and finally creates a normalized text output 180. In some embodiments, the rules based model includes two stages. The first stage may include a segment merger 140, a position switcher 150. The second stage may include a number converter 160 and a metric/mark replacer 170. To normalize the text, the rules based model passes the tagged input text through each stage comprising a variety of rules.

The first operation processed is the text passing through each rule of the first stage. For convenience, the segment merger 140 will be described first. In some embodiments, the segment merger 140 merges similar characters together to retain the meaning of these characters. For example, when converting a date, the segment merger 140 may take separate strings such as "February", "2" and "2014," and merge them together to form 2014/02-02 in order for the text to be properly read by a machine or other computer device.

The position switcher 150 switches the position of the input string such that when read, the normalized text places the words in the correct order. For example, in languages that dictate that a type of a subject is specified before the value of the subject, such as "12.5%" in Chinese, where the percentage is pronounced before the numbers, the position switcher 150 may switch the percent sign to be read before the numeric value. Switching may also take place for any text where the meaning is better preserved by changing the place of characters or words within an input text.

After passing through the first stage, the string of text is processed by the second stage comprising a number converter 160 and a metric/mark replacer 170. The number converter 160 converts number to text. For example, the input may be the string "48," and after the number converter converts the string to text, the string will read "forty-eight" as an output. The metric/mark replacer 170 searches through the text for any punctuation marks or other commonly used abbreviations or other random symbols/characters and replaces them with the word representation. As an example, the metric/mark replacer 170 takes an input string of "&" and replaces it with "and" as an output. Other metrics/marks may contain emojis, slang, symbols, pictographs, divergent spellings, ascii art, or other pictographic items that convey meaning. Finally, after the string has been fully processed, the string is outputted as normalized text 180.

Figure 2:
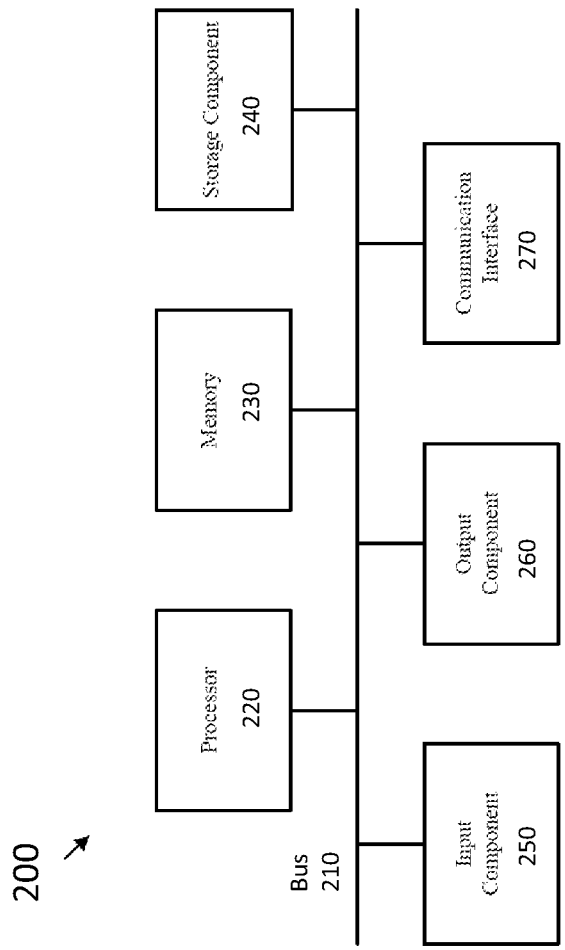
FIG. 2 is a system overview of an embodiment of the text normalization system.

FIG. 2 illustrates an exemplary system 200 of an embodiment for using the text normalization apparatus. The exemplary system 200, may be one of a variety of systems such as a personal computer, a mobile device, a cluster of computers, a server, embedded device, ASIC, microcontroller, or any other device capable of running code. Bus 210 connects the exemplary system 200 together such that all the components may communication with one another. The bus 210 connects the processor 220, the memory 230, the storage component 240, the input component 250, the output component 260 and the interface component.

The processor 220 may be a single processor, a processor with multiple processors inside, a cluster (more than one) of processors, and/or a distributed processing. The processor carries out the instructions stored in both the memory 230 and the storage component 240. The processor 220 operates as the computational device, carrying out operations for the text normalization apparatus. Memory 230 is fast storage and retrieval to any of the memory devices may be enabled through the use of cache memory, which may be closely associated with one or more CPU. Storage component 240 may be one of any longer term storage such as a HDD, SSD, magnetic tape or any other long term storage format.

Input component 250 may be any file type or signal from a user interface component such as a camera or text capturing equipment. Output component 260 outputs the processed information to the communication interface 270. The communication interface may be a speaker or other communication device, which may display information to a user or a another observer such as another computing system.

Figure 3:
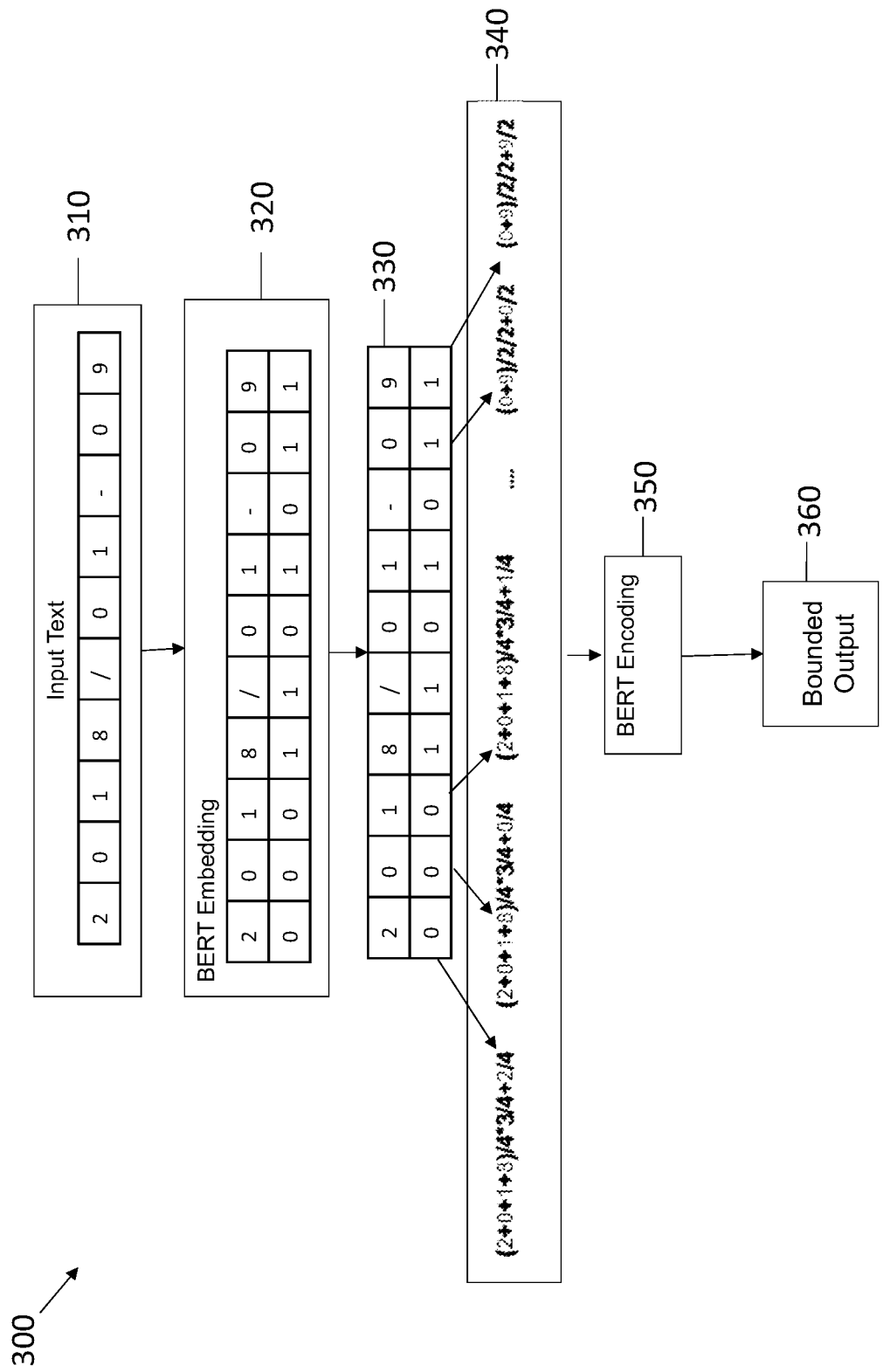
FIG. 3 is an embodiment of phrase-based attention system.

FIG. 3 discloses an embodiment of the phrase-based attention 300, and the process of determining the phrase boundaries as part of input for BERT model. The phrase based attention 300 is comprised of an input text 310, a BERT embedding 320, an embedded string 330, the phrase embedding 340, BERT encoding 350 and a bounded output 360. As an example, the input text 310 contains the date "2018/01-09" for processing. As discussed above, the input text 310 may be any text or other pictographic material. The input text 310 may then be passed to the BERT embedding 320 to be labeled for processing. In the BERT embedding 320, the label may be defined as 0 for non-boundary and 1 for ending of the phrase. For example, "2018" has label "0001."

After the embedding is calculated, the character embedding may be replaced by phrase embedding 340, which may be the average of all character embedding in this phrase with or without the extra weight for that specific character. Here, as an example, the phrase "2018/01-09" gains the weight in the calculation shown in FIG. 3. After the character embedding is processed, the next part is the BERT Encoding 350. Finally the BERT encoding 350 takes the attention weight would be calculated based on the phrase embedding and produces a bounded output 360.

Figure 4:
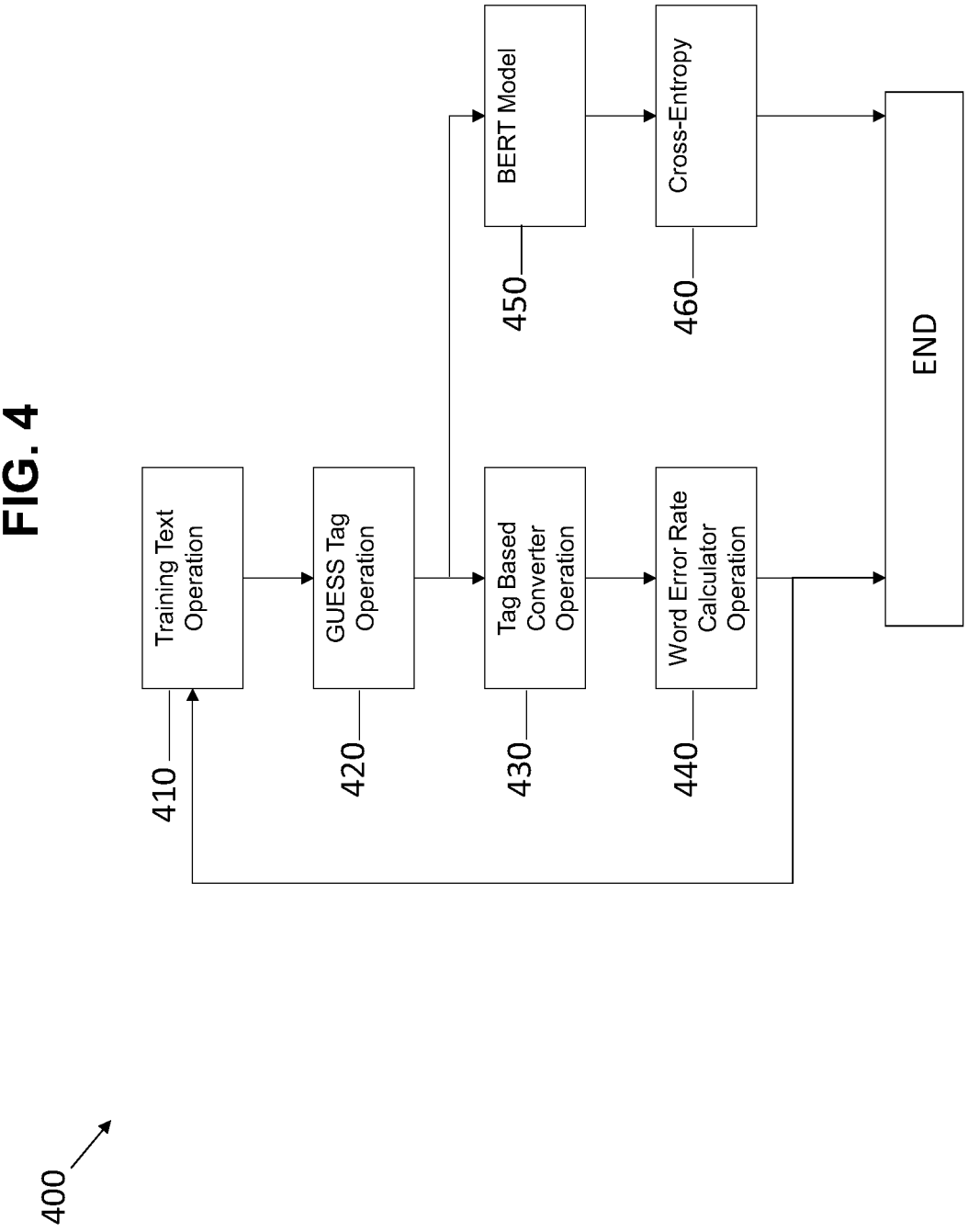
FIG. 4 is an embodiment of the text normalization training.

FIG. 4 depicts an exemplary training method 400 for the tag based converter. The training method 400 comprises a training text operation 410, a GUESS tag operation 420, a tag based converter operation 430, and a word error rate calculator operation 440. Additionally, the training method uses a BERT model 450 and a cross entropy calculator 460. Operationally, the training begins with a training text 410 fed into the GUESS tag 420, which makes a guess as to the type of text present in the input text 410. First, under the GUESS tag operation 420, tags for each character are sorted by character tag frequencies. This operation generates weak supervision information, which is easy to obtain. Second, under the GUESS tag operation 420, continuous digits share the same tag. Additionally, the GUESS tag operation 420 may estimate the computation cost in advance and limit the operation to top 5 possible tags if the predicted time cost is large.

After the guess tags are applied to the input text, the operation proceeds to both the tag based tag based converter operation 430 and the BERT model 450. For sake of convenience, the tag based converter operation 430 and the word error rate calculator operation 440 will be discussed first. The tag based converter 430 converts the input text string to text based upon the tags from the GUESS tag operation 420. For example the tag based converter operation 430 may convert numbers and symbols to text. Then, after converting to text, the string is passed to the word error rate calculation operation 440 (WER), which checks the amount of errors generated after conversion. With a high number of errors, the conversion is sent back through the process with a different tag to retrain the method in order to reduce the number of errors. If the WER is low, the training takes only those sentences with zero WER and uses them to train the BERT model 450. Next, the BERT model 450 is applied to help guess labels and the BERT model 450 is trained with relabeled corpus. The cross entropy 460 is calculated based on the output of the BERT model 450.

Figure 5:
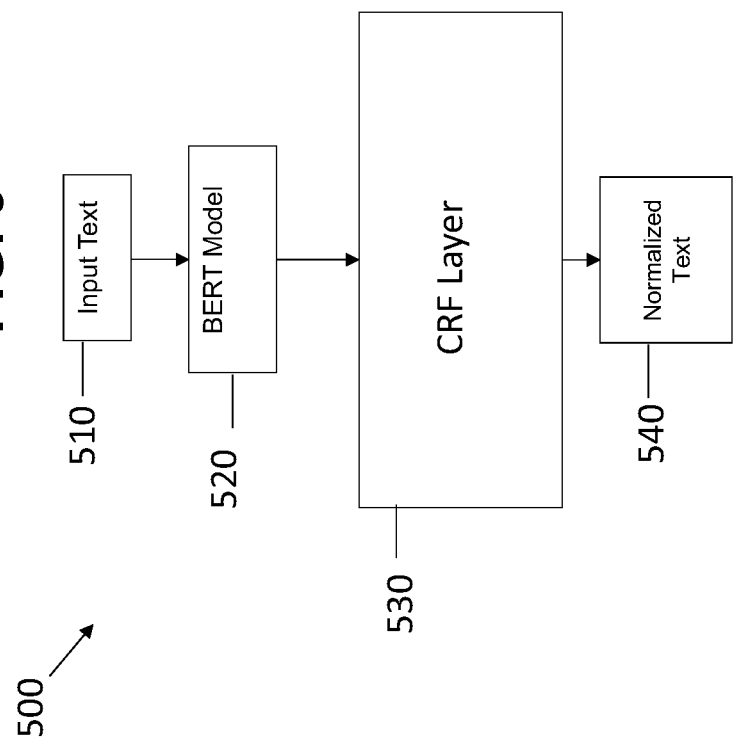
FIG. 5 is an embodiment of a block diagram of the text normalization system.

FIG. 5 discloses an embodiment of the text normalization apparatus 500. The text normalization apparatus 500 comprises an input text 510, fed into a character based Bidirectional Encoder Representations from Transformers (BERT) model 520. The output of the BERT model 520 is then acted upon by Conditional Random Fields (CRF) 530. After operation in the CRF 130, the normalization apparatus 500 finally outputs a normalized text 540.

The input text 510 comprises a string of text made of combinations of characters comprising text and other marks such as punctuation. For example, the input text 510 may be a string such as a date. Dates, typically contain a mixture of marks and text. In dates, there are a variety of forms containing the same information such as "Feb. 2, 2014" or "2/2/14." Other examples may be text messages, which typically contain other marks such as emojis or emails, which contain a variety of punctuation such as the "@" mark. Another example of input text 110 may be metrics or measurements, which may sometimes be ambiguous without context. For example, "16M" may refer to "sixteen megabytes" or "sixteen meters" depending on the reading. Finally, as a non-exhaustive list, the input text 110 may be math, a website url, program code, language text, combination of languages, any combination of the previously listed examples or any unique mark.

After receiving the input text 510, the text normalization apparatus 500 passes the text to the character based BERT model 520. The character based BERT model 520 may be fully trained and labels each character based on predefined tags. In some embodiments, the BERT model 520 is a full-size BERT model or in other embodiments a one-layer BERT model. The one layer BERT model is generally faster than the full-size BERT model, however, the smaller sized module may induce a performance drop such as larger error rates. After tagging the input text, the BERT model 520 passes the information to the rules CRF 130. The CRF loss operation may label the segment as a whole instead of independent characters. The CRF 530 parses through the tagged text and finally creates a normalized text output 540.

The computation involved in text normalization apparatus 500 may be represented by Equations 1-3 below:

$$\beta'_i(x_i,y_i)=\Sigma_{c=1}^{M}\Sigma_{s=1}^{S}[y_i=c]W'_{cs}x_{is} \quad \text{Eq. 1}$$

$$\beta_i(x_i, y_i) = \sum_{c=1}^{M} \sum_{c'=1}^{M} \boxed{[y_i = c][y_{i+1} = c']} \quad \text{Eq. 2}$$

$$E(x_n,y_n)=-\Sigma_{i=1}^{L}B'_i(x_{ni},y_{ni})-\Sigma_{i=1}^{L-1}\beta_i(x_{ni},y_{ni}) \quad \text{Eq. 3}$$

Figure 6:
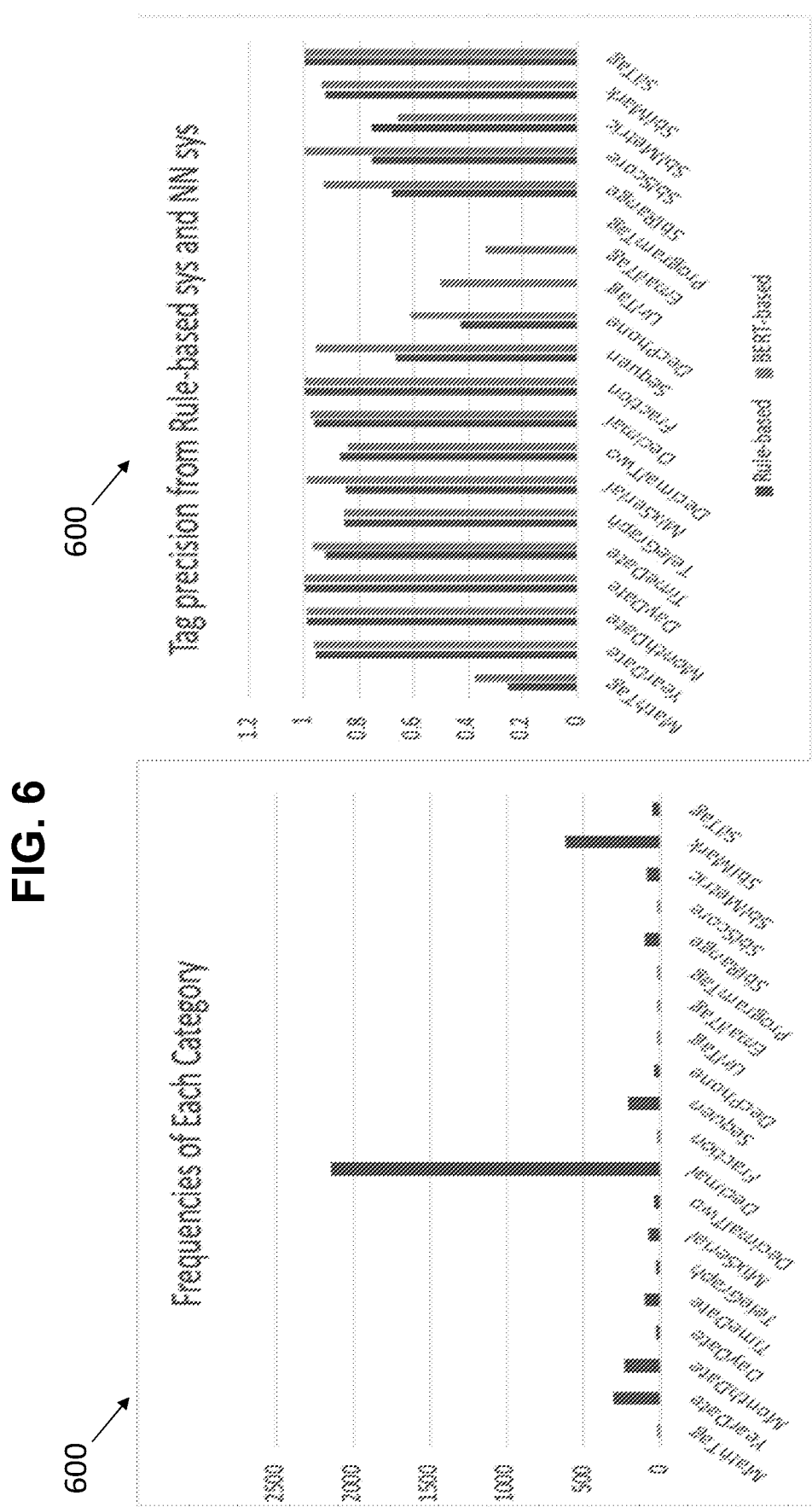
FIG. 6 illustrates two graphs illustrating the results of the text normalization process, in accordance with various embodiments.

FIG. 6 discloses, in two graphs, the results of performing the text normalization process, in accordance with the embodiments of the present disclosure. Compared to rule-based models, the full BERT model lowers the segmentation error dramatically, as an example, about 8.3% to 4.9%, the sentence error drops from 15% to 9.4%. The following figure show the improvement of precision in each category. Given only one layer BERT model, the proposed phrase-based attention could lower the sentence error by 1% absolute drop, better than the CRF which yields only 0.6% drop. Both of them add only 20% running time.

For tag-free two-stage text normalization, the initial result has tag consistency of 63%, and the sentence coverage is 90%, meaning 90% of sentences may be fully converted with pseudo tags. During relabeling, the machine assigned tag is taken as the first choice and all the others are the same. Furthermore, 91% sentences are labelled, and the tag consistency is improved to 70%. The BERT model yields good sentence correctness with 89%, which is a little bit lower than the supervised model 90%, but higher than the rule-based model 85%.

The reason for the low tag consistency is that different categories could be converted by the same rules. For example, the telephone number and the serial number are pronounced in the same way. Therefore, the model may confuse on these tags but the conversion results would be the same.

Figure 7:
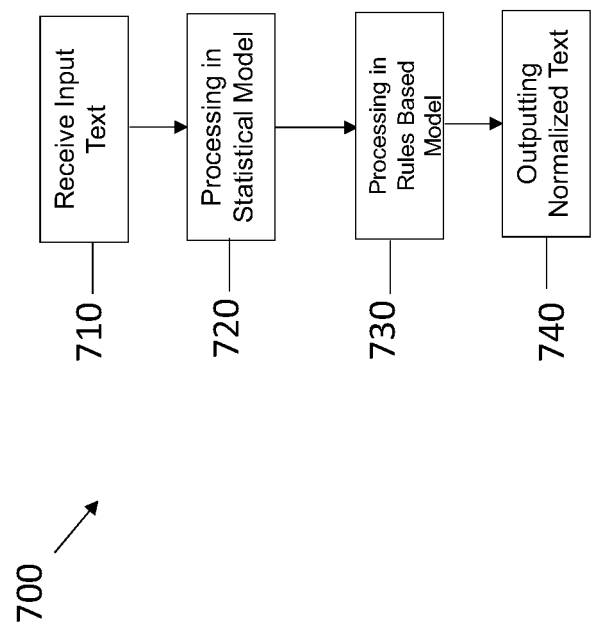
FIG. 7 is a flow chart corresponding to an embodiment of the method of text normalization.

FIG. 7 illustrates a flowchart of an embodiment of performing a training process 700. The operations detailed in the process 700 comprise receiving an input text 710, processing the text in a statistical model 720, processing the text in a rules based model and then outputs a normalized text 740. The input text 710 may comprise a string of text made of combinations of characters comprising text and other marks such as punctuation. The process proceeds to operation 720, where the input text is processed by a statistical model such as the BERT model in an embodiment. In an embodiment, the statistical model may be full size, half size, or other configurations of the BERT model, or other statistical models known to one of ordinary skill in the art. The process proceeds to operation 730, where the output of the statistical model is processed by a rules based model. For example, the rules based model may parse through the tagged text. The rules based model may include two stages, the first stage comprising the segment merger and the position switcher, and the second stage comprising the number converter and the metric/mark replacer. The process proceeds to operation 740, where the tagged input text is normalized and outputted based on rules in each stage of the rules based model.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for normalizing text includes: receiving an input text; processing the input text based on a text normalization model, the processing the input text including: (i) processing the input text in a first stage including a statistical model as a first output; (ii) processing the first output in a second stage including a rule based model as a normalized text; and (iii) outputting the normalized text.

(2) The method for normalizing text of feature (1), in which the statistical model further includes a bidirectional encoder representations from transformer (BERT) model as a baseline model; and in which the BERT model breaks down the input text into at least one character and label, the at least one character including a tag.

(3) The method for normalizing text of feature (1) or (2), in which the processing the first output in the second stage including the rule based model as the normalized text includes selecting from a group consisting of: (i) switching the at least one character with a second at least one character to preserve a meaning of the input text; (ii) merging together the at least one character with another at least one character to preserve a second meaning of the input text; and (iii) converting the at least one character into one or more words based on tags of the first output.

(4) The method for normalizing text of feature (3), in which the converting based on tags includes: transforming at least one number into text; transforming at least one punctuation mark into text; transforming at least one abbreviation into text; and transforming at least one compound phrase containing a combination of text, numbers, marks, and metrics, into text.

(5) The method for normalizing text according to any one of features (2)-(4), in which the BERT model contains a phrase-based attention operation.

(6) The method for normalizing text of feature (5), in which the phrase-based attention operation is defined as (i) an average of the at least one character embedded in the input text with at least one weight associated with the at least one character and (ii) an average of the at least one character embedded in the input text without the at least one weight associated.

(7) The method for normalizing text of feature (5) or (6), in which the BERT model contains a phrase-based attention operation.

(8) The method for normalizing text according to any one of features (5)-(7), in which the BERT model comprises a single layer.

(9) An apparatus for text normalization includes: at least one memory configured to store computer program code; at least one processor configured to operate as instructed by the computer program code, the computer program code including: text normalization code configured to cause the at least one processor to generate at least one normalized text, the text normalization code including: receiving code configured to cause the at least one processor to receive an input text; first stage code configured to cause the at least one processor to generate a statistical model which processes the input text as a first output; and second stage code configured to cause the at least one processor to generate a rule based model which transforms the first output to an outputted normalized text.

(10) The apparatus for text normalization of feature (9), which the statistical model contains bidirectional encoder representations from transformer (BERT) code as a baseline model; and which the BERT code is configured to cause the at least one processor to break down the input text into at least one character and labels the at least one character with a tag.

(11) The apparatus for text normalization of feature (9) or (10), which the second stage code further includes selecting from a group consisting of: position switcher code configured to cause the at least one processor to switch the at least one character with a second at least one character to preserve a meaning of the input text; segment merger code configured to cause the at least one processor to merge together at least one character to preserve a second meaning of the input text; or tag-based converter code configured to cause the at least one processor to convert input texts based on tags.

(12) The apparatus for text normalization of feature (9), which the tag-based converter code further includes: number converter code configured to cause the at least one processor to transform at least one number into text; mark converter code configured to cause the at least one processor to transform at least one punctuation mark into text; metric converter code configured to cause the at least one processor to transform at least one abbreviation for measures into text; and compound converter code configured to cause the at least one processor to transform at least one compound phrase containing a combination of text, numbers, marks and metrics to text.

(13) The apparatus for text normalization of any one of features (9)-13, which the BERT code contains phrase-based attention code.

(14) The apparatus for text normalization of feature (13), which the phrase-based attention code is defined as (i) an average of the at least one character embedded in the input text with at least one weight associated with the at least one character and (ii) an average of the at least one character embedded in the input text without the at least one weight associated.

(15) A non-transitory computer readable medium having instructions stored therein, which when executed by a processor cause the processor to: receive an input text; process the input text based on a text normalization model including: (i) process the input text in a first stage including a statistical model as a first output; (ii) process the first output in a second stage including a rule based model as a normalized text; and (iii) output the normalized text.

(16) The non-transitory computer readable medium according to feature (15), which the statistical model further comprises a bidirectional encoder representations from transformer (BERT) model as a baseline model; and wherein the BERT model breaks down the input text into at least one character and labels the at least one character with a tag.

(17) The non-transitory computer readable medium according to feature (15) or (16), which the processing the first output in a second stage including the rule based model as the normalized text includes selecting from a group consisting of: (i) switch the at least one character with a second at least one character to preserve a meaning of the input text; (ii) merge together at least one character with another at least one character to preserve a second meaning of the input text; or (iii) convert at least one character into one or more words based on tags of the first output.

(18) The non-transitory computer readable medium according to feature (17), which the converting based on tags comprises: transform at least one number into text; transform at least one punctuation mark into text; transform at least one abbreviation for measures into text; and transform at least one compound phrase containing a combination of text, numbers, marks and metrics to text.

(19) The non-transitory computer readable medium according to feature (16)-(18), which the BERT model contains a phrase-based attention operation.

(20) The non-transitory computer readable medium according to feature (19), which the phrase-based attention operation is defined as (i) an average of the at least one character embedded in the input text with at least one weight associated with the at least one character and (ii) an average of the at least one character embedded in the input text without the at least one weight associated.

What is claimed is:

1. A method for normalizing text comprising:
receiving an input text comprising pictographic material;
processing the input text based on a text normalization model, the processing the input text including:
(i) processing the input text in a first stage by inputting the input text comprising the pictographic material into a pre-trained single layer bidirectional encoder representations from transformer (BERT) model to generate a first output comprising a BERT encoded representation of the input text as tagged text;
(ii) processing the first output in a second stage by inputting the first output into a rule based model to generate a normalized text by:
 (a) switching a first position of a first character with a second position of a second character within the input text to preserve a meaning of the input text;
 (b) merging together a third character with a fourth character to preserve a second meaning of the input text; and
 (c) converting the first, second, third, and fourth characters into one or more words based on tags of the first output;
(iii) provide the output of the BERT model to a conditional random fields (CRF) layer;
(iv) outputting the normalized text using an output of the CRF layer,
wherein the rule based model is retrained to reduce a number of errors associated with the normalized text.

2. The method for normalizing text of claim 1,
wherein the single layer BERT model breaks down the input text into at least one character and label, the at least one character including a tag.

3. The method for normalizing text of claim 1,
wherein the converting based on tags includes:
transforming at least one number into text;
transforming at least one punctuation mark into text;
transforming at least one abbreviation into text; and
transforming at least one compound phrase containing a combination of text, numbers, marks, and metrics, into text.

4. The method for normalizing text of claim 2,
wherein the single layer BERT model contains a phrase-based attention operation.

5. The method for normalizing text of claim 4,
wherein the phrase-based attention operation is defined as (i) an average of all characters embedded in the input text with at least one weight associated with the at least one character and (ii) an average of all the characters embedded in the input text without the at least one weight associated.

6. An apparatus for text normalization comprising:
at least one memory configured to store computer program code;
 at least one processor configured to operate as instructed by the computer program code, the computer program code including:
text normalization code configured to cause the at least one processor to generate at least one normalized text, the text normalization code including:
receiving code configured to cause the at least one processor to receive an input text comprising pictographic material;
first stage code configured to cause the at least one processor to input the input text comprising the pictographic material into a pre-trained single layer bidirectional encoder representations from transformer (BERT) model to generate a first output comprising a BERT encoded representation of the input text as tagged text;
second stage code configured to cause the at least one processor to process the first output in a second stage inputting the first output into a rule based model to generate a normalized text by (a) switching a first position of a first character with a second position of a second character within the input text to preserve a meaning of the input text;

(b) merging together a third character with another a fourth character to preserve a second meaning of the input text; and (c) converting the first, second, third, and fourth characters into one or more words based on tags of the first output;

providing code configured to cause the at least one processor to provide the output of the BERT model to a conditional random fields (CRF) layer;

output code configured to cause the at least one processor to output the normalized text using an output of the CRF layer, wherein the rule based model is retrained to reduce a number of errors associated with the normalized text.

7. The apparatus for text normalization of claim 6,
wherein the BERT code is configured to cause the at least one processor to break down the input text into at least one character and labels the at least one character with a tag.

8. The apparatus for text normalization of claim 6,
wherein the tag-based converter code further includes:
number converter code configured to cause the at least one processor to transform at least one number into text;
mark converter code configured to cause the at least one processor to transform at least one punctuation mark into text;
metric converter code configured to cause the at least one processor to transform at least one abbreviation for measures into text; and
compound converter code configured to cause the at least one processor to transform at least one compound phrase containing a combination of text, numbers, marks and metrics to text.

9. The apparatus for text normalization of claim 7,
wherein the BERT code contains phrase-based attention code.

10. The apparatus for text normalization of claim 9,
wherein the phrase-based attention code is defined as (i) an average of all characters embedded in the input text with at least one weight associated with the at least one character and (ii) an average of all the characters embedded in the input text without the at least one weight associated.

11. A non-transitory computer readable medium having instructions stored therein, which when executed by a processor cause the processor to:
receive an input text comprising pictographic material;
process the input text based on a text normalization model including:

(i) process the input text in a first stage by inputting the input text comprising the pictographic material into a pre-trained single layer bidirectional encoder representations from transformer (BERT) model to generate a first output comprising a BERT encoded representation of the input text as tagged text;

(ii) process the first output in a second stage by inputting the first output into a rule based model to generate a normalized text by:
(a) switching a first position of a first character with a second position of a second character within the input text to preserve a meaning of the input text;
(b) merging together the third character with another a fourth character to preserve a second meaning of the input text; and
(c) converting the first, second, third, and fourth characters into one or more words based on tags of the first output;

(iii) provide the output of the BERT model to a conditional random fields (CRF) layer;

(iv) output the normalized text using an output of the CRF layer, wherein the rule based model is retrained to reduce a number of errors associated with the normalized text.

12. The non-transitory computer readable medium according to claim 11,
wherein the single layer BERT model breaks down the input text into at least one character and labels the at least one character with a tag.

13. The non-transitory computer readable medium according to claim 11,
wherein the converting based on tags comprises:
transform at least one number into text;
transform at least one punctuation mark into text;
transform at least one abbreviation for measures into text; and
transform at least one compound phrase containing a combination of text, numbers, marks and metrics to text.

14. The non-transitory computer readable medium according to claim 12,
wherein the single layer BERT model contains a phrase-based attention operation.

15. The non-transitory computer readable medium according to claim 14,
wherein the phrase-based attention operation is defined as (i) an average of all characters embedded in the input text with at least one weight associated with the at least one character and (ii) an average of all the characters embedded in the input text without the at least one weight associated.

* * * * *